United States Patent [19]

Albach

[11] Patent Number: 5,191,226
[45] Date of Patent: Mar. 2, 1993

[54] CIRCUIT FOR SUPPLYING PLURAL LOADS VIA A SMPS AND/OR DIRECTLY FROM AN AC VOLTAGE SOURCE

[75] Inventor: Manfred Albach, Aachen, Fed. Rep. of Germany

[73] Assignee: U.S. Philips Corporation, New York, N.Y.

[21] Appl. No.: 582,297

[22] Filed: Sep. 13, 1990

[30] Foreign Application Priority Data

Oct. 5, 1989 [DE] Fed. Rep. of Germany ....... 3933202

[51] Int. Cl.⁵ .............................. H02J 3/06; H02J 3/14
[52] U.S. Cl. ...................................... 307/31; 219/486; 307/41
[58] Field of Search ................. 307/31, 32, 33, 34, 307/38, 41, 127; 315/195, 198; 219/486, 10, 55 B, 508, 492; 361/77; 323/222

[56] References Cited

U.S. PATENT DOCUMENTS

| | | | |
|---|---|---|---|
| 4,313,061 | 1/1982 | Thomas | 307/32 |
| 4,786,799 | 11/1988 | Welle, Jr. et al. | 219/486 |
| 4,829,159 | 5/1989 | Braun et al. | 219/486 |
| 5,006,975 | 4/1991 | Neufeld | 323/222 |

Primary Examiner—A. D. Pellinen
Assistant Examiner—Richard Elms
Attorney, Agent, or Firm—Bernard Franzblau

[57] ABSTRACT

A very inexpensive and compact circuit arrangement having low electrical losses and which supplies a load with energy from an AC voltage source by means of a switch-mode power supply unit (22). The load includes at least two partial loads (3, 4) and electric energy is supplied to one of the partial loads (3 or 4) through the switch-mode power supply unit (22) and, as desired, also to at least a second one of the partial loads (4 or 3) directly from the AC voltage source.

21 Claims, 1 Drawing Sheet

CIRCUIT FOR SUPPLYING PLURAL LOADS VIA A SMPS AND/OR DIRECTLY FROM AN AC VOLTAGE SOURCE

BACKGROUND OF THE INVENTION

This invention relates to a circuit arrangement for supplying a load with energy from an AC-voltage source by means of a switch-mode power supply unit (SMPS). Such circuit arrangements are known from Otmar Kilgenstein's treatise "Schaltnetzteile in der Praxis", published by Vogel-Buchverlag, 1986.

If such circuit arrangement and the switch-mode power supply units used in them are to be efficiently utilised in a wide range of applications, especially for a load with a high power consumption, it is desirable to keep any power losses so low that special measures for cooling of the circuit arrangement can be dispensed with. For financial reasons, moreover, it would be advantageous to keep the dimensions of the circuit arrangement components as small as possible.

SUMMARY OF THE INVENTION

The invention has for an object to modify a circuit arrangement of the type described in the opening paragraph in such a way that a very inexpensive, compact construction combined with low electrical losses is achieved in view of the above considerations.

This object is achieved in that the load comprises at least two partial loads, and in that energy can be supplied to one of the partial loads through the switch-mode power supply unit and, as desired, also to at least a second one of the partial loads directly from the source. In the present context, the supply of energy "directly" to a partial load from the source means that the partial load is supplied with energy via a circuit that does not include the switch-mode power supply unit.

It is possible in many applications to subdivide a load into several partial loads, for example, sub-loads, while alternatively a load to be supplied may itself consist of several partial loads, for example, several heater elements, lamps, etc. As a rule it will be possible in the case of a load thus constituted not to supply the individual partial loads (sub-loads) with the same power at any given moment. The invention is based on this recognition and discloses a circuit arrangement in which only one of the partial loads is supplied through the switch-mode power supply unit at any time for adjusting the total power load, while at the same time one or several partial loads, as required, are provided with power directly from the AC-voltage source. The switch-mode power supply unit then needs to be designed only for the power load corresponding to a part of the number of partial loads, so that a unit of a much lower power rating and a mechanically considerably more compact construction can be achieved with a very low power loss. In addition, the partial loads which are supplied directly from the source are preferably connected to that source through separate switching elements, which on the one hand usually have even lower electrical losses than does a switch-mode power supply, and on the other hand can also be dimensioned for the transfer of smaller powers in accordance with the power rating of the connected partial load. Even though the number of components to be used in the invention is increased in comparison with a switch-mode power supply unit dimensioned for the total power rating, still a more compact overall construction and lower losses are achieved, while the adjustment possibility of the power consumption from zero up to the maximum power also is guaranteed. The components used in order to accomplish all of this are also very inexpensive.

In the circuit arrangement according to the invention, first only one partial load is supplied through the switch-mode power supply unit in the case of a gradual increase in the power supply, depending on the number of partial loads present. When this partial load has reached its maximum (partial) power consumption, it or another partial load is supplied directly from the source, while for a further increase in the total power consumption a further partial load is supplied through the switch mode power supply unit with variable power consumption. In this way all partial loads can be switched on one after the other until all partial loads are supplied with the maximum powers they can receive.

In many applications it is necessary for the time average of the power consumptions of the individual partial loads to be the same. According to a further embodiment of the invention, this is achieved in that during a first time period a first partial load can be supplied through the switch-mode power supply unit and, as required, also at least a second partial load is supplied directly from the source, while in a second time period the second partial load can be supplied through the switch-mode power supply unit and, if required, also at least the first partial load directly from the source, which sequence can be continued cyclically. Thus, each of the partial loads is supplied through the switch-mode power supply unit during one time period in the rhythm of the subsequent time periods, while the other partial loads can be cyclically switched on, as required. On average, an even power consumption among all partial loads is thus achieved in a simple manner.

In a particularly simple further embodiment of the invention, the load comprises only two partial loads, of which at any given moment one can be supplied through the switch-mode power supply unit and the other one, if desired, additionally directly from the source, and vice versa.

Preferably the first and second time periods each correspond at least substantially to an integral number of half cycles of the AC voltage. Thus, a simple switch-over of the supply of the partial loads through the switch-mode power supply unit and, as required, directly from the source is made possible. This switch-over takes place in particular at the change from one half cycle of the AC voltage to the next.

According to a further embodiment of the invention, the first time period corresponds to a first half cycle and the second time period to a subsequent second half cycle of the AC-voltage. In this way a particularly short-period averaging of the power consumption of the partial loads is achieved, while in addition a particularly simple switch-over is made possible.

In an advantageous further embodiment, the circuit arrangement according to the invention comprises
two load branches which each comprise a partial load and a switch connected in series with it, and which are connected in series between two source terminals, one of the poles of each partial load being connected to a respective source terminal,
two diversion branches and two return branches, each in series between the source terminals,
a connection branch between each of the source terminals and the connection point between the partial load and the switch of the load branch connected to the other one of the source terminals, further characterized in that the switch-mode power supply unit comprises a switching line which runs via an inductive resistor and a high-frequency operated chopper switch, and an open line, via which a current in the inductive resistor can be branched off when the chopper switch is not conducting, and in that the junction point of the load branches is connected to the junction point of the diversion branches via the switching line and to the junction point of the return branches via the open line, while during each half cycle of the AC-voltage current can be conducted in one of the load branches via the switching line and the opposite diversion branch, or back to the partial load via the open line and a return branch and, if desired, also through the other partial load and the connection branch connected to it.

With this arrangement, which can be built up in a particularly simple and inexpensive way, a good and simple adaptation to various operating conditions of the type described above is possible. The switches in the load branches in this circuit arrangement are preferably provided in the form of unidirectional semiconductor switches so that they only pass current in one direction, while they are always non-conducting in the other direction. In the simplest case such switches can be formed by a series connection of a transistor and a diode. Because of the lower losses, a field effect transistor or an insulated gate bipolar transistor (IGBT) is preferably used for this purpose.

The connection branches of the above circuit arrangement comprise bidirectional semiconductor switches in an advantageous embodiment since, in contrast to the switches in the load branches, they must conduct in both directions. A simple and low loss construction for such switches is found in, for example, triacs.

According to a still further embodiment of the invention, the diversion branches comprise unidirectionally conducting elements. This is necessary to allow for a flow of current only in the direction from the switch-mode power supply unit to the source terminals because otherwise the source would be short-circuited. The diversion branches, therefore, are preferably provided with diodes.

Since, on the contrary, no special requirements are imposed on the return branches, apart from keeping losses low, these return branches preferably have simple semiconductor switches, for example, unidirectionally or bidirectionally conducting field effect transistors (IGBT) or, alternatively, thyristors.

In the circuit arrangement described above, the semiconductor switches in the load, connection, and return branches are switched over preferably at the half-cycle change of the AC-voltage. For example, they may be controlled via a control which generates a control signal which depends on the polarity of the AC-voltage and which changes at the moment of its zero passage.

The circuit arrangement according to the invention derives an at least substantially sinusoidal current from the source in every operating condition so that harmonic components and interferences are kept negligibly small, also for loads with a high power consumption.

BRIEF DESCRIPTION OF THE DRAWINGS

An embodiment of the invention is shown in the accompanying drawings and is discussed in the paragraphs below.

In the drawing.

DESCRIPTION OF THE PREFERRED EMBODIMENTS

Figure 1:
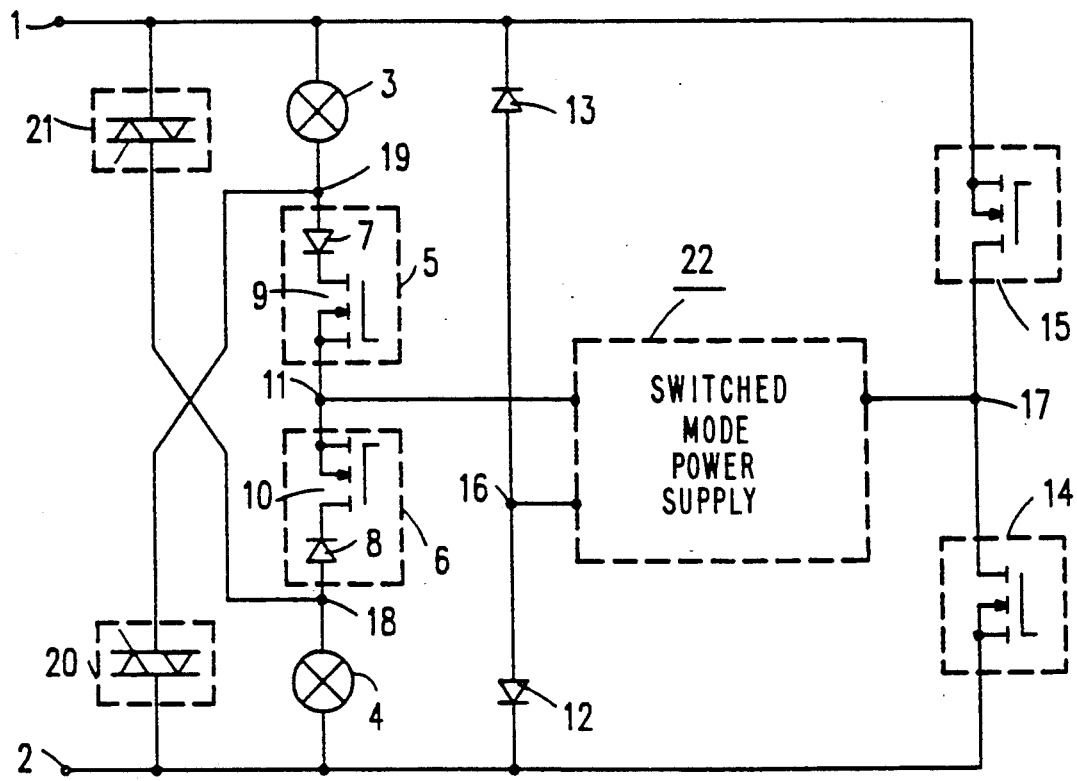
FIG. 1 shows a circuit arrangement laid out in accordance with the invention for supplying a load consisting of two partial loads.

The circuit arrangement of FIG. 1, which can be connected to an AC-voltage source (not shown) via a first and a second terminal 1, 2, respectively, comprises between terminals 1, 2 a series circuit of two load branches, each consisting of a series circuit of one partial load 3, 4 and one switch 5, 6, respectively. The partial loads 3, 4 in the example of FIG. 1 are in the form of lamps which are to be supplied with variable power for lighting or cooking purposes. Other partial loads, however, like heater elements or other power-consuming appliances may also be connected.

The switches 5, 6 each comprise a series circuit of a diode 7, 8 and a field effect transistor 9, 10, respectively. Thus, they conduct the current only from the respective partial load 3, 4 towards a junction point 11 between the first and the second load branches 3, 5 and 4, 6, respectively. In the present example, field effect transistors 9, 10 were chosen for the switches 5, 6. In an alternative embodiment of the arrangement according to FIG. 1, the switches 5, 6 may also be arranged as thyristors with the correct polarity.

Between the terminals 1, 2, furthermore, two diversion branches 12, 13 and two return branches 14, 15, are connected respectively in series with one another. The diversion branches 12, 13 each consist of a diode whose anode terminals are joined together at a second junction point 16 and whose cathode terminals are connected to the first and second source terminals, respectively. With these unidirectionally conducting elements it is achieved that the current can flow away from the second junction point 16 with small power losses and without additional control means to one of the terminals 1, 2, as required, without a short-circuit arising between the terminals 1, 2.

The return branches 14, 15 in the present example consist of simple semiconductor switches, preferably field effect transistors with low power losses. Each of these two field effect transistors is connected between a respective terminal 1, 2 and a third junction point 17. During operation, the return branches 14, 15 conduct current only in the direction from the third junction point 17 towards the terminals 1, 2, respectively, at any time, so that unidirectional semiconductor switches also can be used here, just as for the switches 5, 6. Depending on the design, the solution with the lowest power losses and the lowest construction cost may be chosen here.

FIG. 1 shows how a second connection branch 20 runs from a fourth junction point 19 between the first partial load 3 and the first switch 5 to the second source terminal 2, while a first connection branch 21 is arranged between the first terminal 1 and a fifth junction point 18, which interconnects the second partial load 4 and the second switch 6. The connection branches 20, 21 comprise bidirectional semiconductor switches, preferably triacs, through which a low-loss current flow is made possible in both directions.

The switches 5, 6, the semiconductor switches forming part of the return branches 14, 15, and the connection branches 20, 21 each have a control terminal through which they can be switched to a conducting or non-conducting state, as required. The control terminals (merely indicated in FIG. 1) are connected to a control circuit (not shown), which controls the operating states of the switches, return branches and connection branches in accordance with a programmed time sequence which will be explained further below.

Figure 2:
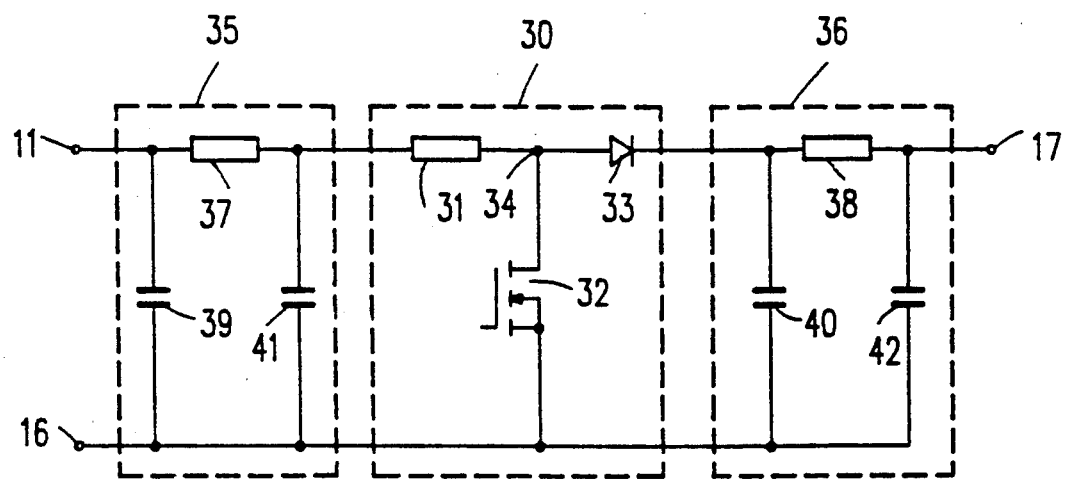
FIG. 2 shows a switch-mode power supply unit for use in a circuit arrangement according to FIG. 1.

Finally, the circuit arrangement of FIG. 1 comprises a switch-mode power supply unit 22 which is connected to the first, second, and third junction points 11, 16, 17 and of which FIG. 2 shows a possible embodiment. This embodiment comprises a converter group 30 with an inductive resistor 31, a chopper switch 32 and a fly-wheel diode 33. The inductive resistor 31 and the chopper switch 32, arranged in series between the first and second junction points 11 and 16, together form a switching line, while the fly-wheel diode 33 leads from a sixth junction point 34 to the third junction point 17, thus forming an open line. The chopper switch 32 can be high-frequency operated. When the latter is conducting, a current flows from the first junction point 11 through the inductive resistor 31 to the second junction point 16, energy being stored in the inductive resistor 31. When the chopper switch 32 is made non-conducting, the current arising from the self-induction in the inductive resistor 31 flows via the fly-wheel diode 33 to the third junction point 17. The time average of the current through the inductive resistor is determined by the time intervals during which the chopper switch 32 is conducting or non-conducting.

A first interference suppression filter 35 is connected to the first and second junction points 11, 16 before the converter group 30, while a second interference suppression filter 36 is connected to the third junction point 17 after this group. The interference suppression filters 35, 36 comprise series inductances 37, 38, and two parallel capacitors 39, 41 and 40, 42, respectively. The interference suppression filters 35, 36 serve to suppress high-frequency interference voltages and are dimensioned in such a way that they have no appreciable influence on the energy flow through the converter group 30 and thus through the switch-mode power supply unit 22.

Several distinct operating modes are possible in the circuit arrangement described above, some particularly favourable ones will be explained in detail below by way of example. To this end, for example, a sinusoidal voltage with a frequency of 50 Hz is fed to the terminals 1 and 2. Each of the partial loads 3, 4 is designed for a maximum power consumption designated as PO, so that the total power load, Pmax, is twice PO. The switch-mode power supply unit 22 is arranged so that the average power taken up by the partial load 3 or 4 operated at any time through the switch-mode power supply unit 22 can be regulated in a range from 0 to PO by a variation of the pulse duty factor of a square-wave control voltage with a frequency of, for example, more than 20 kHz, which is supplied to the control terminal of the chopper switch 32.

In a first operating mode the connection branches 20, 21 are switched to be permanently non-conducting by the control circuit (not shown). During a first time interval, which in the present example corresponds to a first half wave of the AC-voltage at the terminals 1, 2, and while a positive voltage is present at the first terminal 1 relative to the second terminal 2, the second switch 6 and the second return branch 14 are also made non-conducting by the control circuit, while on the other hand the first switch 5 and the first return branch 15 are switched to the conducting state. Thus, a current flows from the first terminal 1 through the first partial load 3, the first switch 5, the switching line of the switch-mode power supply unit 22, and the second diversion branch 12 to the second terminal 2, when the chopper switch 32 is conducting. When the vibrator switch 32 is non-conducting, the current flows in the open line of the switch-mode power supply unit 22, i.e. through the inductive resistor 31 and the fly-wheel diode 33, from the first partial load 3 and the third switch 5 via the third return branch 15 back to the first partial load 3. Thus, in this operating mode, during the first time interval the circuit arrangement represents a flux converter for the first partial load 3, which flux converter is capable of adjusting the power consumed by this partial load in known manner. A particularly favourable, low-loss operating mode which can be applied here has been described in German Patent Application P 38 38 430.2.

During a second time interval, which preferably corresponds to a second half cycle of the AC-voltage immediately following the first one, during which the voltage at the second terminal 2 exceeds that at the first terminal 1, the first switch 5 and the first return branch 15 are made non-conducting, and the second switch 6 and the second return branch 14 are made conducting, while the connection branches 20, 21 remain non-conducting. A current is then conducted from the second terminal 2 via the second partial load 4, the second switch 6, the switch-mode power supply unit 22, and the first diversion branch 13 to the first terminal 1, while the switch-mode power supply unit 22 is again capable of adjusting the power consumption of the second partial load 4 in the manner described. In this situation, while the chopper switch 32 is closed, a current flows through the second partial load 4, the second switch 6, the open line of the switch-mode power supply unit 22, and the second return branch 14.

If in the operating mode described the frequency and pulse-duty factors of the control voltage supplied to the chopper switch 32 are kept constant during a half cycle of the AC-voltage, a sinusoidal current through the source is obtained, without any further measures being taken, in the interference suppression filters 35, 36 after the current components through the partial loads which have the frequency of the control voltage, i.e. all high-frequency current components, have been averaged.

Whereas in the first operating mode the total power consumed by the load can be varied between 0 and PO, total powers between PO and Pmax are adjusted in a second operating mode. To this end, the switches 5, 6 and the return branches 14, 15 are switched in the same manner and the switch-mode power supply unit 22 is operated in the same way as in the first operating mode during subsequent time intervals, more particularly half cycles of the AC-voltage. In addition, however, the first connection branch 21 is made conducting by the control circuit, whereas the second connection branch 20 remains non-conducting during the first time interval, i.e. the first half cycle of the AC-voltage, during which the voltage at the first terminal 1 is positive relative to the voltage at the second terminal 2. In addition to the current through the first partial load 3 and the switch-mode power supply unit 22, a non-adjusted current now flows from the first terminal 1 through the first connection branch 21 and the second partial load 4 to the second terminal 2. From this current results a constant average power PO in the second partial load which, added to the adjustable power in the first partial load 3, gives the total power consumed by the overall load.

During the second time interval, more particularly the second half cycle of the AC-voltage, during which the second terminal 2 has a positive voltage relative to the first terminal 1, the first connection branch 21 is made non-conducting in the second operating mode, whereas the second connection branch 20 is made conducting. This yields a fixed power PO in the first partial load 3, while the power in the second partial load 4 is adjustable through the switch-mode power supply unit 22. The fixed-value current then flows from the second terminal 2 through the second connection branch 20 and the first partial load 3 to the first terminal 1.

A stepless variation of the power consumed by the load between 0 and Pmax is thus possible in the two operating modes described. Power is always transferred through the switch-mode power supply unit 22 to the two partial loads 3, 4, with a maximum power PO, for each in turn.

In many applications a fine power adjustment of the kind offered by the switch-mode power supply unit 22 is not necessary, especially in the power range around the value PO or Pmax, it being sufficient instead to feed the load with the fixed power PO or Pmax. In this case the control circuit can make the switch-mode power supply unit 22 and the switches 5, 6 as well as the return branches 14, 15 non-conducting in a power range, the extent of which can be chosen, around PO or Pmax. The partial loads 3, 4 are then supplied with energy exclusively through the connection branches 20, 21. This preferably takes place in the power range around PO in such a way that during a first time interval only one of the partial loads 3, 4 and in a second time interval only the second one of the partial loads 3, 4 is supplied with power. For example, this is the second partial load 4 in conjunction with the first connection branch 21 during the first time interval, while the first terminal 1 has a positive voltage, and in the second time interval this is the first partial load 3 in conjunction with the second connection branch 20, while the second terminal 2 has a positive voltage. In the range near the highest possible power Pmax, the two connection branches 20, 21 are switched to be permanently conducting so that both partial loads 3, 4 are provided with energy continuously. A particularly low-loss supply of the load is possible in these last-mentioned operating modes since any power losses inherent in the switch-mode power supply unit 22 are avoided.

I claim:

1. A circuit arrangement for supplying at least first and second loads with electric energy from an AC-voltage source comprising: a switch-mode power supply unit, first and second input terminals for supplying the AC-voltage to the circuit arrangement, first switching means for coupling said switch-mode power supply unit to said first and second loads so as to supply the electric energy to the first and second loads during first and second time periods, respectively, and second switching means for coupling the second and first loads to said first and second input terminals, respectively, whereby said loads can be selectively directly coupled to the AC-voltage source via the second switching means and the input terminals.

2. A circuit arrangement as claimed in claim 1, wherein during the first time period the first load is supplied with electric energy through the switch-mode power supply unit and at least the second load is directly supplied with electric energy from the AC-voltage source, and during the second time period the second load is supplied with electric energy through the switch-mode power supply unit and at least the first load is directly supplied with electric energy from the AC-voltage source, wherein said first and second time periods occur cyclically.

3. A circuit arrangement as claimed in claim 2, wherein, the first and the second time periods each correspond at least substantially to an integral number of half cycles of the AC-voltage.

4. A circuit arrangement as claimed in claim 3, wherein, the first time period corresponds to a first half cycle and the second time period to a subsequent second half cycle of the AC-voltage.

5. A circuit arrangement for supplying electric energy to at least first and second loads from an AC-voltage source comprising:
    first and second input terminals for supplying the AC-voltage to the circuit arrangement,
    first and second load branches which each comprise a load and a switch connected in series and which load branches are connected in series between the first and second input terminals, one terminal of each load being connected to a respective input terminal,
    first and second diversion branches coupled in series between the input terminals and first and second return branches coupled in series between the input terminals,
    connection branch coupled between each of the input terminals and a connection point between the load and the switch of the load branch connected to the other one of the input terminals,
    a switch-mode power supply unit which comprises a switching line including an inductive resistor and a high-frequency operated chopper switch, and an open line via which a current in the inductive resistor can be branched off when the chopper switch is not conducting, and wherein a junction point of the first and second load branches is connected to a junction point of the first and second diversion branches via the switching line and to a junction point of the first and second return branches via the open line, whereby during each half cycle of the AC-voltage a current can be conducted in one of the load branches via the switching line and the opposite diversion branch, or back to the load via the open line and a return branch and also through the other load and the connection branch connected to it.

6. A circuit arrangement as claimed in claim 5 wherein the switches in the load branches comprise unidirectional semiconductor switches.

7. A circuit arrangement as claimed in claim 5, wherein the connection branches comprise respective bidirectional semiconductor switches.

8. A circuit arrangement as claimed in claim 5, wherein the diversion branches comprise respective unidirectionally conducting elements.

9. A circuit arrangement as claimed in claim 5 wherein the return branches comprise respective simple semiconductor switches.

10. A circuit arrangement as claimed in claim 5, wherein the connection branches and the return branches include respective switches and the switches in the load branches, the connection branches and the return branches are switched over at zero crossings of the AC-voltage.

11. An apparatus for supplying electric energy to at least first and second loads from a source of AC voltage comprising:
first and second input terminals for connection to the source of AC voltage,
a first load and a first controlled switch connected in a first series circuit,
a second load and a second controlled switch connected in a second series circuit,
means coupling said first and second series circuit to said first and second input terminals such that said first and second series circuits have a common junction point,
a switch mode power supply unit,
second means coupling the switch mode power supply unit to said common junction point and via first and second diversion branches to said first and second input terminals, said switch mode power supply unit including a semiconductor switch operated at a higher frequency than that of the AC voltage source, and
switching means for directly coupling the first and second loads to said first and second input terminals, and wherein
the switching means and the first and second controlled switches are operated so that electric energy is supplied from the input terminals to one of said first and second loads via the switch mode power supply unit and also to the other one of said loads from the input terminals via at least one current path that excludes the switch mode power supply unit.

12. An apparatus as claimed in claim 11 wherein said switching means comprises;
a first bi-directional semiconductor switch coupled between the first input terminal and a first junction point located between the second load and the second controlled switch, and
a second bi-directional semiconductor switch coupled between the second input terminal and a second junction point located between the first load and the first controlled switch.

13. An apparatus as claimed in claim 12 wherein said first and second series circuits are serially connected between the first and second input terminals.

14. An apparatus as claimed in claim 13 further comprising;
first and second return branches coupled between a terminal of the switch mode power supply and said first and second series circuits, respectively, each return branch including a controlled semiconductor switch, and wherein
said controlled switches in the first and second series circuit and in the first and second return branches and said first and second bi-directional semiconductor switches are switched at zero crossings of the AC voltage.

15. An apparatus as claimed in claim 11 wherein said switching means, said first and second controlled switches and said semiconductor switch are operated so that, during a first time period the first load is supplied from the input terminals with electric energy via the switch mode power supply unit and the second load is directly supplied with electric energy from the input terminals, and during a second time period, the second load is supplied from the input terminals with electric energy via the switched mode power supply unit and the first load is directly supplied with electric energy from the input terminals.

16. An apparatus as claimed in claim 15 wherein the first and the second time periods each correspond at least substantially to an integral number of half cycles of the AC voltage.

17. An apparatus as claimed in claim 11 wherein said first and second diversion branches comprise respective unidirectional conductive elements.

18. An apparatus as claimed in claim 17 wherein said respective unidirectional conductive elements comprise first and second diodes connected in series opposition to said input terminals.

19. An apparatus as claimed in claim 11 wherein the switched mode power supply unit comprises;
an inductive element connected in a third series circuit with the semiconductor switch between said common junction point and a second common junction point of said first and second diversion branches, and
a unidirectional conductive element coupling a third junction point located between the inductive element and the semiconductor switch to said first and second input terminals via first and second return branches, respectively.

20. An apparatus as claimed in claim 11 wherein said first and second series circuits are serially connected between the first and second input terminals.

21. An apparatus as claimed in claim 20 wherein the switch mode power supply unit comprises;
a switching line including, in series, an inductive element and the semiconductor switch, and coupled between said common junction point and a second common junction point of said first and second diversion branches, and a further line through which a current in the inductive element flows to said first or second input terminals when the semiconductor switch is cut-off.

* * * * *